United States Patent
Cai et al.

(10) Patent No.: US 9,832,210 B2
(45) Date of Patent: Nov. 28, 2017

(54) MULTI-CORE BROWSER AND METHOD FOR INTERCEPTING MALICIOUS NETWORK ADDRESS IN MULTI-CORE BROWSER

(71) Applicant: BEIJING QIHOO TECHNOLOGY COMPANY LIMITED, Beijing (CN)

(72) Inventors: Yongjian Cai, Beijing (CN); Zhigang Wang, Beijing (CN); Huan Ren, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 14/440,408

(22) PCT Filed: Aug. 23, 2013

(86) PCT No.: PCT/CN2013/082143
§ 371 (c)(1),
(2) Date: May 4, 2015

(87) PCT Pub. No.: WO2014/071763
PCT Pub. Date: May 15, 2014

(65) Prior Publication Data
US 2015/0281262 A1      Oct. 1, 2015

(30) Foreign Application Priority Data
Nov. 7, 2012  (CN) .......................... 2012 1 0441640

(51) Int. Cl.
*H04L 29/06*   (2006.01)
*H04L 29/08*   (2006.01)

(52) U.S. Cl.
CPC ......... *H04L 63/1408* (2013.01); *H04L 67/02* (2013.01)

(58) Field of Classification Search
CPC ............. H04L 63/1416; H04L 63/1408; H04L 63/1441; H04L 63/1458; G06F 21/552
(Continued)

(56) References Cited

U.S. PATENT DOCUMENTS

| 8,127,358 B1 * | 2/2012 | Lee ...................... G06F 21/564 |
| | | 726/22 |
| 8,966,625 B1 * | 2/2015 | Zuk ....................... H04L 63/145 |
| | | 709/227 |

(Continued)

FOREIGN PATENT DOCUMENTS

| CN | 102355469 A | | 2/2012 |
| CN | 102385594 | * | 3/2012 |
| CN | 102385594 A | * | 3/2012 |

OTHER PUBLICATIONS

Ning, G., et al, English translation of Abstract only of Chinese Application No. CN102355469 A, Publication Date: Feb. 15, 2012, Title: Method for displaying credibility certification for website in address bar of browser, one page.

(Continued)

*Primary Examiner* — Farid Homayounmehr
*Assistant Examiner* — Sanchit Sarker
(74) *Attorney, Agent, or Firm* — Baker & Hostetler LLP

(57) ABSTRACT

The disclosure discloses a multi-core browser and a method for intercepting a malicious network address in a multi-core browser, wherein a malicious network address determining module is arranged in the multi-core browser. The method comprises: obtaining URL information of a webpage currently requested to be loaded; after determining a core for rendering the webpage to be loaded according to the URL information, initiating a request to the malicious network address determining module arranged at the multi-core browser side for judging whether a network address is a malicious network address; and intercepting loading access (Continued)

to a network address which is determined as a malicious network address at the multi-core browser side. The disclosure is capable of solving the problem that a terminal can not intercept a malicious network address accessed in the browser since no third-party device is installed on the terminal or when a third-party device is not started on the terminal; and achieving the beneficial effect of ensuring a timely and effective interception of a malicious network address.

16 Claims, 5 Drawing Sheets

(58) Field of Classification Search
USPC .......................................................... 726/23
See application file for complete search history.

(56) References Cited

U.S. PATENT DOCUMENTS

| | | | |
|---|---|---|---|
| 2003/0208684 A1* | 11/2003 | Camacho | G06F 21/32 713/186 |
| 2005/0177597 A1* | 8/2005 | Elmer | G06F 17/30899 |
| 2006/0224951 A1* | 10/2006 | Burke | G06F 17/30899 715/234 |
| 2007/0174915 A1* | 7/2007 | Gribble | G06F 21/53 726/24 |
| 2008/0172382 A1* | 7/2008 | Prettejohn | H04L 63/126 |
| 2009/0138573 A1* | 5/2009 | Campbell | G06F 21/554 709/218 |
| 2011/0157219 A1* | 6/2011 | Chakra | G06F 3/14 345/619 |
| 2011/0314546 A1* | 12/2011 | Aziz | G06F 21/56 726/24 |
| 2011/0321160 A1* | 12/2011 | Mohandas | G06F 21/56 726/22 |
| 2012/0072913 A1* | 3/2012 | Uola | G06F 9/5033 718/100 |
| 2014/0096246 A1* | 4/2014 | Morrissey | G06F 21/51 726/23 |

OTHER PUBLICATIONS

Fangmin, L. et al, English translation of Abstract only of Chinese Application No. CN102385594 A, Publication Date: Mar. 21, 2012, Title: Method and device for controlling inner cores of multi-core browser, one page.
Weihua, T. C. et al, English translation of Abstract only of Chinese Application No. CN102467633 A, Publication Date: May 23, 2012, Title: Method and system for safely browsing webpage, one page.
Cai, Y. et al, English translation of Abstract only of Chinese Application No. CN102932356 A, Publication Date: Feb. 13, 2013, Title: Malicious website intercepting method and device in multi-core browser, one page.
International Search Report regarding PCT/CN2013/082143 dated Dec. 5, 2013, 2 pages.

* cited by examiner

MULTI-CORE BROWSER AND METHOD FOR INTERCEPTING MALICIOUS NETWORK ADDRESS IN MULTI-CORE BROWSER

FIELD OF THE INVENTION

The disclosure relates to the field of computer network security, and in particular, to a method for intercepting a malicious network address in a multi-core browser and a multi-core browser.

BACKGROUND OF THE INVENTION

A multi-core browser refers to a browser comprising two or more cores, for example, a dual-core browser used in the prior art. In the prior art, owing to a high penetration rate of the IE browser, most online banking and payment systems only support the Trident core of the IE, and online trading business, e.g., normal payments and transfers, etc. can not be done by using other browsers. However, non-IE browsers using a core, e.g., the WebKit core, the chrome core, etc. in the prior art have more and more users because of having a higher performance and a better rendering effect. Therefore, multi-core browsers have occurred in the prior art, which use the WebKit core or the chrome core with a higher speed for access when accessing a general website without the need of online trading, which is a "high speed mode", and use the Trident core for access when accessing a website needing online trading, e.g., the Alipay or online banking, which is a "compatible mode".

A malicious network address comprises a network address which may cause a terminal used for access to be infected with a malicious program such as a Trojan, a virus, etc., for example, a network address of a malicious website and a network address of a webpage linked to Trojan attacks, etc. Therein, a malicious website refers to a website with a malicious program such as a Trojan, a virus, etc. planted inside maliciously. A malicious website induces a user to access the website by "disguised website service content". Once a user enters the malicious website, a program such as a Trojan, a virus, etc. planted in the website will be triggered to cause a terminal used by the user for access to be infected, thereby possibly leading to the occurrence of a dangerous situation in which an account or private information is lost, and the like. A webpage linked to Trojan attacks refers to a webpage with a link to a Trojan website embedded. When the user accesses a webpage linked to Trojan attacks, a request for access to a Trojan website will be triggered, and once the access is successful, a terminal used by the user will be caused to be infected, thereby possibly leading to the occurrence of a dangerous situation in which an account or private information is lost, and the like.

In the prior art, a third-party device independent of the browser is used to intercept a malicious network address. The browser passes the relevant information of a website to be accessed to the third-party device, and a malicious network address is intercepted by the third-party device according to the relevant information. Since the interception of a malicious network address in the browser completely relies on the third-party device, when the third-party device is not installed on the terminal or the third-party device on the terminal is not started, a malicious network address accessed in the browser can not be intercepted.

SUMMARY OF THE INVENTION

In view of the above problems, the disclosure is proposed to provide a method for intercepting a malicious network address in a multi-core browser and a multi-core browser and a program thereof which overcome the above problems or at least in part solve or mitigate the above problems.

According to an aspect of the disclosure, there is provided a method for intercepting a malicious network address in a multi-core browser, wherein a malicious network address determining module is arranged in the multi-core browser, the method comprising: obtaining URL information of a webpage currently requested to be loaded; after determining a core for rendering the webpage to be loaded according to the URL information, initiating a request to the malicious network address determining module arranged at the multi-core browser side for judging whether a network address is a malicious network address; and intercepting loading access to the network address which is determined as a malicious network address at the multi-core browser side.

Correspondingly, the disclosure further provides a multi-core browser for intercepting a malicious network address, the multi-core browser comprising: a URL information obtaining module, a core determining module, a malicious network address determining module and a malicious network address access intercepting module, the URL information obtaining module configured to obtain URL information of a webpage currently requested to be loaded; the core determining module configured to determine a core for rendering the webpage to be loaded according to the URL information, and after finishing the determination, initiating a request to the malicious network address determining module for judging whether a network address is a malicious network address; the malicious network address determining module configured to determine whether the URL is a malicious network address after receiving the request; and the malicious network address access intercepting module configured to intercept loading access to the network address which is determined as a malicious network address.

According to yet another aspect of the disclosure, there is provided a computer program comprising a computer readable code which causes a user terminal to perform the method for intercepting a malicious network address in a multi-core browser according to any of claims 1-10, when said computer readable code is running on the user terminal.

According to still another aspect of the disclosure, there is provided a computer readable medium storing the computer program as claimed in claim 21 therein.

The beneficial effects of the disclosure lie in that: the technical solution according to the disclosure, in which a malicious network address determining module is arranged in a multi-core browser, obtains URL information of a webpage currently requested to be loaded; after determining a core for rendering the webpage to be loaded according to the URL information, initiates a request to the malicious network address determining module arranged at the multi-core browser side for judging whether a network address is a malicious network address; and intercepts loading access to a network address which is determined as a malicious network address at the multi-core browser side. Since the malicious network address determining module for judging whether a network address is a malicious network address is an internal module of the browser, the malicious network address determining module is started simultaneously when the browser is started, thereby solving the problem that a terminal can not intercept a malicious network address accessed in the browser since no third-party device is installed on the terminal or when a third-party device is not started on the terminal; and achieving the beneficial effect of ensuring a timely and effective interception of a malicious network address.

The above description is merely an overview of the technical solutions of the disclosure. In the following particular embodiments of the disclosure will be illustrated in order that the technical means of the disclosure can be more clearly understood and thus may be embodied according to the content of the specification, and that the foregoing and other objects, features and advantages of the disclosure can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the disclosure. And throughout the drawings, like reference signs are used to denote like components. Therein.

DETAILED DESCRIPTION OF THE INVENTION

Figure 1:
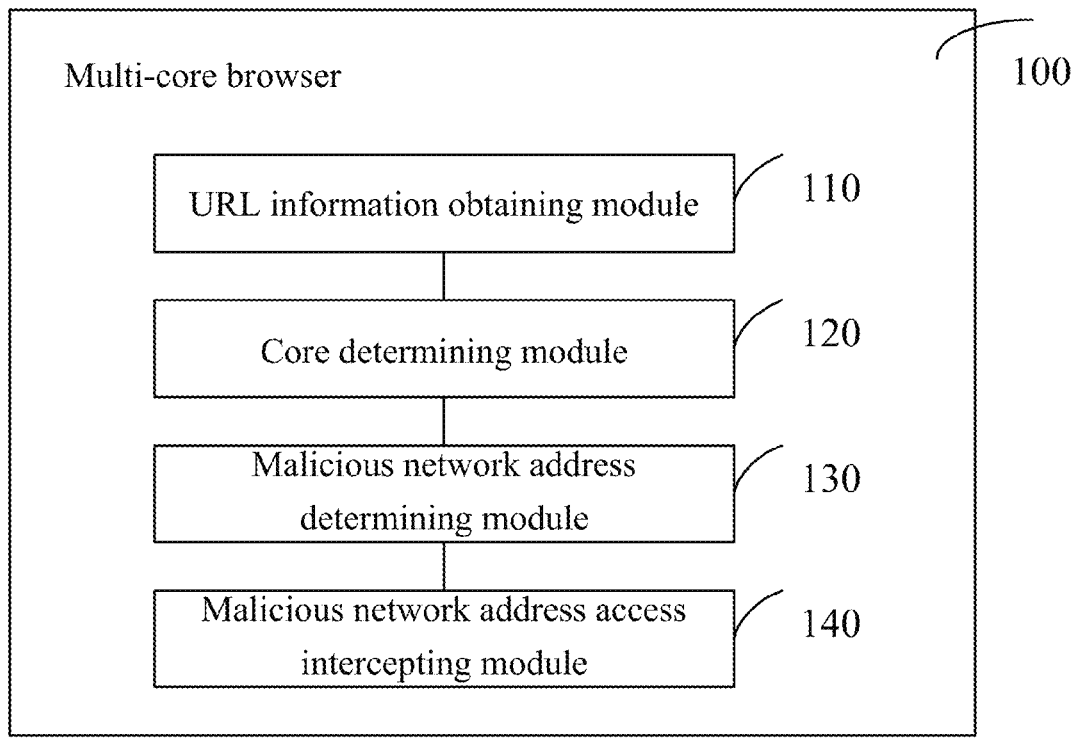
FIG. 1 shows a structural diagram of a multi-core browser for intercepting a malicious network address according to an embodiment of the disclosure.

In the following exemplary embodiments of the disclosure will be described in more detail with reference to the accompanying drawings. While the exemplary embodiments of the disclosure are shown in the drawings, it will be appreciated that the disclosure may be implemented in various forms and should not be limited by the embodiments set forth herein. Rather, these embodiments are provided in order for one to be able to more thoroughly understand the disclosure and in order to be able to fully convey the scope of the disclosure to those skilled in the art.

Reference is made to FIG. 1, which shows FIG. 1 shows a structural diagram of a multi-core browser for intercepting a malicious network address according to an embodiment of the disclosure. The multi-core browser comprises a URL information obtaining module 110, a core determining module 120, a malicious network address determining module 130 and a malicious network address access intercepting module 140.

The URL information obtaining module 110 is configured to obtain URL information of a webpage currently requested to be loaded.

The core determining module 120 is configured to determine a core for rendering the webpage to be loaded according to the obtained URL information, and after finishing the determination, initiate a request to the malicious network address determining module 130 for judging whether a network address is a malicious network address.

As an example, when determining a core for rendering the webpage to be loaded, the core determining module 120 queries a core corresponding to the URL in the currently accessed URL information in a mapping table in which network addresses correspond to cores, and determines to use the queried core when the webpage to be loaded is rendered.

For example, in a dual-core browser comprising the IE core and the chrome core, when a user inputs a URL or clicks to trigger the change of a URL in the address bar of the browser, the URL information obtaining module 110 obtains URL information of a webpage currently requested to be loaded. Then, the core determining module 120 uses a mapping table of network addresses and cores to search the URL in network addresses corresponding to the IE core, and if it is found, the IE core is used when the URL is rendered, or otherwise, the module 120 searches the URL in network addresses corresponding to the chrome core, and if it is found, the chrome core is used when the URL is rendered. If the URL is not found in the network addresses corresponding to both the IE core and the chrome core, then a default core, e.g., the IE core, is used for rendering.

For another example, in a multi-core browser comprising the IE core, the Webkit core and the Gecko core, when a user inputs a URL or clicks to trigger the change of a URL in the address bar of the browser, the URL information obtaining module 110 obtains URL information of a webpage currently requested to be loaded. Then, the core determining module 120 uses a mapping table of network addresses and cores to search the URL in network addresses corresponding to the IE core, and if it is found, the IE core is used when the URL is rendered, or otherwise, the module 120 searches the URL in network addresses corresponding to the Webkit core, and if it is found, the Webkit core is used when the URL is rendered. If the URL is not found in the network addresses corresponding to both the IE core and the Webkit core, then the URL is searched in network addresses corresponding to the Gecko core, and if it is found, the Gecko core is used when the URL is rendered. If the URL is not found in the network addresses corresponding to the IE core, the Gecko core and the Webkit core, then a default core, e.g., the Webkit core, is used for rendering. In embodiments of the disclosure, for the convenience of description, a browser constituted by the IE core and the Webkit core is mostly used as an example for disclosure and description, however, the scope of the disclosure is not limited to such a dual-core case, wherein a browser with three cores is also applicable to the inventive concept of the disclosure.

The malicious network address determining module 130 is configured to determine whether the URL in the URL information is a malicious network address after receiving the request for judging whether a network address is a malicious network address.

As an example, after receiving the request, the malicious network address determining module 130 judges whether the URL in the URL information belongs to a local white list, and if the URL belongs to the local white list, then loads the URL and invokes the determined core to render the webpage to be loaded; and if the URL does not belong to the local white list, then judges whether the URL belongs to a local black list, and if the URL belongs to the local black list, then queries the security information of the URL from a network address security determining server.

Further, after determining that the URL does not belong to the local black list, the malicious network address determining module 130 loads the URL at the multi-core browser side, and performs a cloud network address security query for the URL by the network address security determining server.

Therein, the malicious network address determining module 130 is further configured to download an updated black list or white list by the network address security determining server, and use the downloaded black list or white list to update the local black list or the local white list.

Thus, the white list and the black list used by the malicious network address determining module 130 may be an updated white list and black list downloaded to the browser locally after updated at the server side, which increases the possibility of the URL being found in the local white list and black list, reduces the number of times the cloud network address security query is performed via a network, improves the efficiency of intercepting a malicious network address, and saves the network resources.

In addition, the malicious network address determining module 130 further receives the result of the cloud network address security query from the network address security determining server, and caches the result. After determining that the URL does not belong to the local black list, the malicious network address determining module 130 first queries the security information corresponding to the URL in the cached result to judge whether the URL is a malicious network address, and when the security information corresponding to the URL is not queried in the cached result, then performs the cloud network address security query for the URL by the network address security determining server.

Thus, the update of the white list and the black list is complemented by caching the result of the cloud network address security query, and when the white list and the black list have not been updated timely, a malicious network address judgment may also be performed by querying the cache, which further reduces the possibility of performing the cloud network address security query, avoids the transmission of a large amount of query information, and saves the network resources.

When performing the cloud network address security query for the URL by the network address security determining server, the malicious network address determining module 130 first judges the type of the URL: if it is a non-download type, then informs the network address security determining server to perform the cloud network address security query for the URL; and if it is a download type, then records the URL in the download request, forms a uniform resource locator link URLList, extracts the original URL and a resource URL from the URLList, and informs the network address security determining server to perform the cloud network address security query for the original URL and the resource URL.

For example, if the content type in an Http request for accessing a network address is RAR, then it indicates that what is requested to be transmitted this time is a compressed file with the RAR format, and this is a download type. Since a general download page will use a jump to arrive at a network address of the resource download, addresses in the request comprise an original address, a jump address and an address for resource download which the jump arrives at. Thereby, a URLList is formed. A general processing manner is to perform the cloud network address security query for all the URLs in the above URLList, however, multiple jumps will appear in such a manner, which makes the operation efficiency lower. In this embodiment, the cloud network address security query is performed for the first address, i.e. the original URL, and the last address, i.e. the resource URL, in the URLList, and the cloud network address security query for the intermediate jump URLs which need not be queried is omitted, which improves the query efficiency, and saves the network resources.

The malicious network address access intercepting module 140 is configured to intercept loading access to a network address which is determined as a malicious network address.

Figure 2:
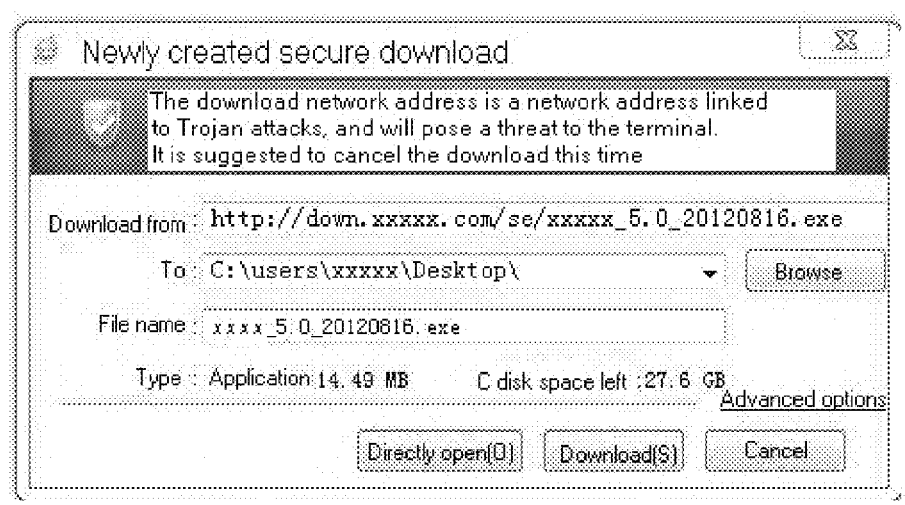
FIG. 2 shows a schematic diagram of a security information display interface of download type according to an embodiment of the disclosure.

After the malicious network address determining module 130 determines that a URL of download type is a malicious network address, the malicious network address access intercepting module 140 pops up a security information display interface to prompt that the website to be accessed is a malicious website, and provides in the security information display interface a cancel button for cancelling the download. Reference is made to FIG. 2, which is a schematic diagram of a security information display interface of download type in this embodiment.

As described in FIG. 2, a security information display interface of a malicious network address of download type comprises:

prompt information that the download is dangerous, for example, "The download network address is a network address linked to Trojan attacks, and will pose a threat to the terminal. It is suggested to cancel the download this time" being displayed on the upper portion of the interface, prompting a user who is conducting the download;

a download path, e.g., http://down.xxxxx.com/se/xxxxx_5.0_20120816.exe;

a local saving path, e.g., "C:\users\xxxxx\Desktop\";

a local path selection button "browsing";

a name of a file to be downloaded, e.g., "xxxxx_5.0_20120816.exe";

relevant information of a file to be downloaded, e.g., type "application", size "14.49 MB";

relevant information of a local saving disk, e.g., "C disk space left: 27.6 GB"; and an operation selection button, e.g., "directly open", "download" and "cancel".

Thus, in the security information display interface of a malicious network address of download type there are provided prompt information that the download is dangerous, relevant information on the download and a selection button for the download operation. FIG. 2 is just one example of the security information display interface of a malicious network address of download type, the disclosure is not limited thereto, and the security information display interface of a malicious network address of download type may comprise any security prompt information related with a malicious network address of download type. A user may cancel the download operation here after knowing the above danger prompt information. Preferably, a link address of secure download content may be provided in the above interface to be recommended to the user for the user to start the download of the recommended secure download content after click and cancel the content of the download this time.

The schematic diagram of the interface of the above preferred solution is omitted and not shown, which adds a link address of recommended secure download content compared to FIG. 2.

After the malicious network address determining module 130 determines that a URL of non-download type is a malicious network address, the malicious network address access intercepting module 140 pops up a security information display interface to prompt that the website to be accessed is a malicious website, and provides in the security information display interface a close button for closing the current webpage.

Figure 3A:
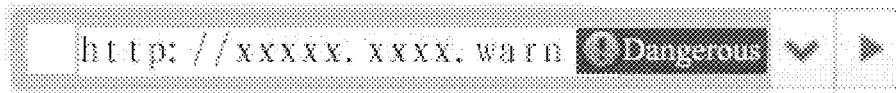
FIG. 3a shows a schematic diagram of security information of non-download type in an address bar according to an embodiment of the disclosure.

FIG. 3a shows a schematic diagram of security information of non-download type in an address bar according to an embodiment of the disclosure. Therein, when a URL of non-download type is a malicious network address, security prompt information is displayed in the address bar, e.g., "dangerous", and for eye catching, the security information prompt may be highlighted using a color such as the red color, etc.

Figure 3B:
FIG. 3b shows a schematic diagram of a popup window of security information of non-download type according to an embodiment of the disclosure.

FIG. 3b shows a schematic diagram of a popup window of security information of non-download type according to an embodiment of the disclosure. When the security information prompt in the address bar is clicked, a window as shown in FIG. 3b is popped up. The window comprises: further security prompt information; the network address to be accessed; page close button, e.g., "close the current page"; and other functional links, for example, a link to continue access to the URL "ignore the warning and continue access", a link to perform a security detection "secure access", a link to complain about the malicious website "network address complaint", and a link to access a monitoring center "network address monitoring center".

The window in FIG. 3b and the address bar in FIG. 3a may be displayed individually respectively, or also may be displayed in one and the same interface simultaneously.

FIG. 3a and FIG. 3b are just one example of the security information display interface of a malicious network address of non-download type, the disclosure is not limited thereto, and the security information display interface of a malicious network address of non-download type may comprise any security prompt information related with a malicious network address of non-download type.

Thus, by the security information display interface, a user is prompted that the network address to be accessed is a malicious network address, and the user is provided with an interface which may be used for closing a webpage.

From the above, in this embodiment, since the malicious network address determining module 130 for judging whether a network address is a malicious network address is an internal module of the browser, the malicious network address determining module 130 is started simultaneously when the browser is started, thereby solving the problem that a terminal can not intercept a malicious network address accessed in the browser since no third-party device is installed on the terminal or when a third-party device is not started on the terminal; and achieving the beneficial effect of ensuring a timely and effective interception of a malicious network address.

Figure 4:
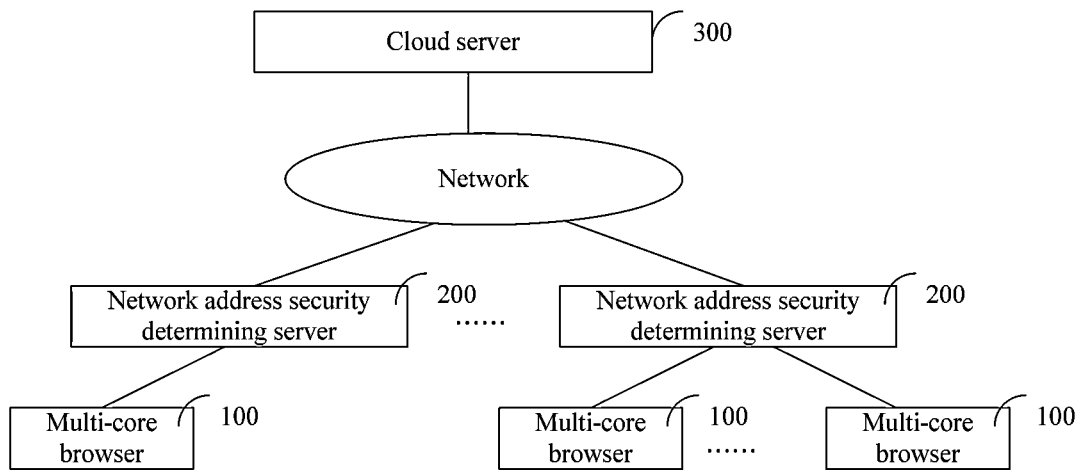
FIG. 4 shows a structural diagram of a system for intercepting a malicious network address according to an embodiment of the disclosure.

FIG. 4 shows a structural diagram of a system for intercepting a malicious network address according to an embodiment of the disclosure. The system comprises the above-mentioned multi-core browser 100, the network address security determining server 200 and a cloud server 300.

The network address security determining server 200 is configured to return the security information of a URL to the multi-core browser 100, and perform a cloud network address security query for the URL.

The cloud server 300 is configured to return the result of the cloud network address security query for the URL.

The cloud server 300 may be connected to a plurality of network address security determining servers 200 directly or via a network. The network address security determining server 200 may provide services to one or more multi-core browser 100. Here, there is no specific limitation to the number of various apparatuses in the system. Therein, the network address security determining server 200 and the multi-core browser 100 may be located at one and the same terminal, or also may be located at different terminals and connected via a network, and there is no specific limitation thereto here.

Figure 5:
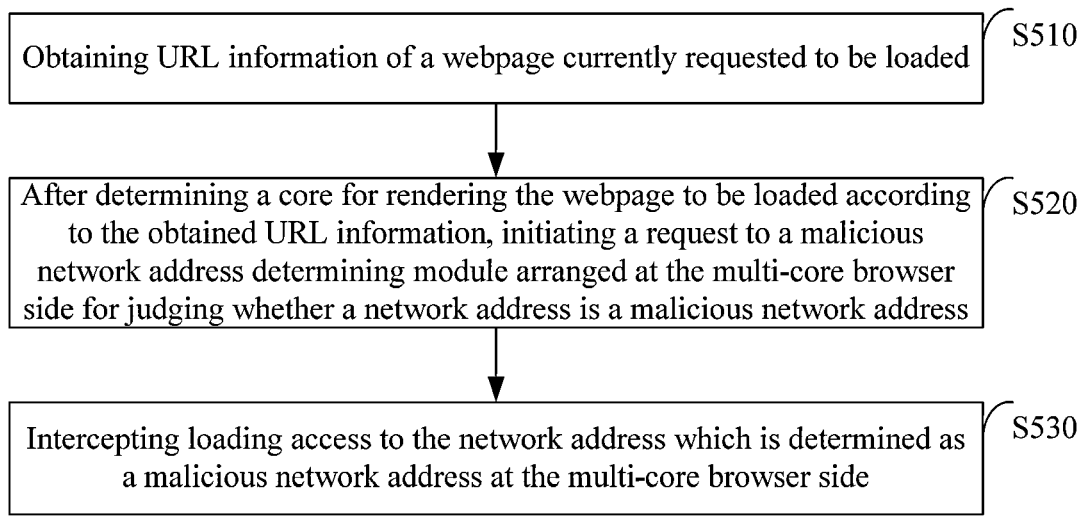
FIG. 5 shows a flow chart of a method for intercepting a malicious network address in a multi-core browser according to an embodiment of the disclosure.

Reference is made to FIG. 5, which shows a flow chart of a method for intercepting a malicious network address in a multi-core browser according to an embodiment of the disclosure. The method comprises the following steps.

At step S510, URL information of a webpage currently requested to be loaded is obtained, and thereafter, step S520 is performed.

At step S520, after determining a core for rendering the webpage to be loaded according to the obtained URL information, a request is initiated to a malicious network address determining module arranged at the multi-core browser side for judging whether a network address is a malicious network address, and thereafter, step S530 is performed.

As an example, the determining a core for rendering the webpage to be loaded according to the URL information particularly comprises: querying a core corresponding to the URL in the URL information in a mapping table in which network addresses correspond to cores, and determining to use the queried core when the webpage to be loaded is rendered.

For example, in a dual-core browser comprising the IE core and the chrome core, when a user inputs a URL or clicks to trigger the change of a URL in the address bar of the browser, URL information of a webpage currently requested to be loaded is obtained. Then, a mapping table of network addresses and cores is used to search the URL in network addresses corresponding to the IE core, and if it is found, the IE core is used when the URL is rendered, or otherwise, the URL is searched in network addresses corresponding to the chrome core, and if it is found, the chrome core is used when the URL is rendered. If the URL is not found in the network addresses corresponding to both the IE core and the chrome core, then a default core, e.g., the IE core, is used for rendering.

For another example, in a multi-core browser comprising the IE core, the Webkit core and the Gecko core, when a user inputs a URL or clicks to trigger the change of a URL in the address bar of the browser, URL information of a webpage currently requested to be loaded is obtained. Then, a mapping table of network addresses and cores is used to search the URL in network addresses corresponding to the IE core, and if it is found, the IE core is used when the URL is rendered, or otherwise, the URL is searched in network addresses corresponding to the Webkit core, and if it is found, the Webkit core is used when the URL is rendered. If the URL is not found in the network addresses corresponding to both the IE core and the Webkit core, then the URL is searched in network addresses corresponding to the Gecko core, and if it is found, the Gecko core is used when the URL is rendered. If the URL is not found in the network addresses corresponding to the IE core, the Gecko core and the Webkit core, then a default core, e.g., the Webkit core, is used for rendering.

Figure 6:
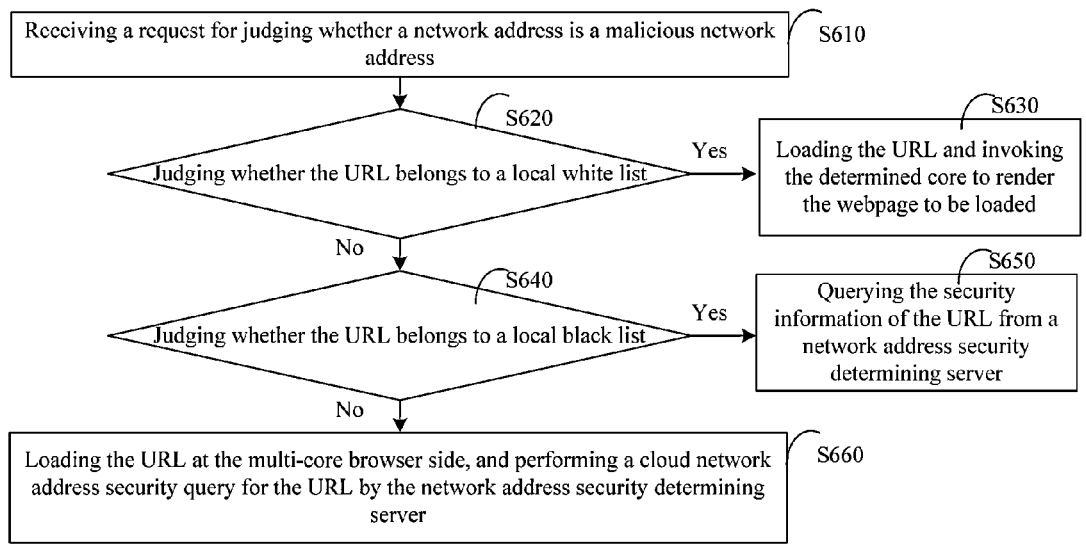
FIG. 6 shows a flow chart of an operation of judging whether a network address is a malicious network address by a malicious network address determining module according to an embodiment of the disclosure.

Reference is made to FIG. 6, which shows a flow chart of an operation of judging whether a network address is a malicious network address by a malicious network address determining module according to an embodiment of the disclosure. The malicious network address determining module performs the following operations.

At step S610, a request is received for judging whether a network address is a malicious network address, in which request URL information is comprised.

At step S620, it is judged whether the URL in the URL information belongs to a local white list, and if the URL belongs to the local white list, then step S630 is performed, and if the URL does not belong to the local white list, then step S640 is performed.

At step S630, the URL is loaded and the determined core is invoked to render the webpage to be loaded.

At step S640, it is judged whether the URL belongs to a local black list, and if the URL belongs to the local black list, then step S650 is performed, and if the URL does not belong to the local black list, then step S660 is performed.

At step S650, the security information of the URL is queried from a network address security determining server.

At step S660, the URL is loaded at the multi-core browser side, and a cloud network address security query is performed for the URL by the network address security determining server.

Figure 7:
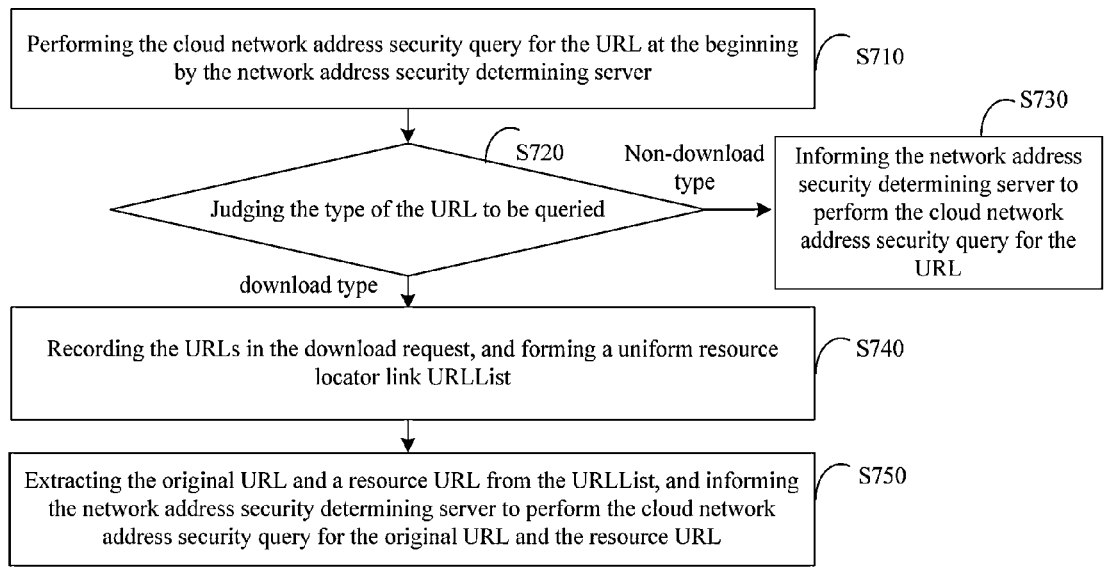
FIG. 7 shows a flow chart of an operation of a cloud network address security query for a URL according to an embodiment of the disclosure.

As an example, FIG. 7 shows a flow chart of an operation of a cloud network address security query for a URL according to an embodiment of the disclosure. Therein, that the malicious network address determining module performs a cloud network address security query for the URL by the network address security determining server comprises the following steps.

At step S710, the cloud network address security query is performed for the URL at the beginning by the network address security determining server.

At step S720, it is judged the type of the URL to be queried, if it is a non-download type, then step S730 is performed, and if it is a download type, then step S740 is performed.

At step S730, the network address security determining server is informed to perform the cloud network address security query for the URL.

At step S740, the URL in the download request is recorded, and a uniform resource locator link URLList is formed.

At step S750, the original URL and a resource URL are extracted from the URLList, and the network address security determining server is informed to perform the cloud network address security query for the original URL and the resource URL.

For example, if the content type in an Http request for accessing a network address is RAR, then it indicates that what is requested to be transmitted this time is a compressed file with the RAR format, and this is a download type. Since a general download page will use a jump to arrive at a network address of the resource download, addresses in the request comprise an original address, a jump address and an address for resource download which the jump arrives at. Thereby, a URLList is formed. A general processing manner is to perform the cloud network address security query for all the URLs in the above URLList, however, multiple jumps will appear in such a manner, which makes the operation efficiency lower. In this embodiment, the cloud network address security query is performed for the first address, i.e. the original URL, and the last address, i.e. the resource URL, in the URLList, and the cloud network address security query for the intermediate jump URLs which need not be queried is omitted, which improves the query efficiency, and saves the network resources.

Further, the malicious network address determining module downloads an updated black list or white list by the network address security determining server, and uses the downloaded black list or white list to update the local black list or the local white list.

Thus, the white list and the black list used by the malicious network address determining module may be an updated white list and black list downloaded to the browser locally after updated at the server side, which increases the possibility of the URL being found in the local white list and black list, reduces the number of times the cloud network address security query is performed via a network, improves the efficiency of intercepting a malicious network address, and saves the network resources.

In addition, the malicious network address determining module receives the result of the cloud network address security query from the network address security determining server, and caches the result. After determining that the URL does not belong to the local black list, the malicious network address determining module first queries the security information corresponding to the URL in the cached result to judge whether the URL is a malicious network address, and when the security information corresponding to the URL is not queried in the cached result, then performs the cloud network address security query for the URL by the network address security determining server.

Thus, the update of the white list and the black list is complemented by caching the result of the cloud network address security query, and when the white list and the black list have not been updated timely, a malicious network address judgment may also be performed by querying the cache, which further reduces the possibility of performing the cloud network address security query, avoids the transmission of a large amount of query information, and saves the network resources.

At step S530, loading access to a network address which is determined as a malicious network address is intercepted at the multi-core browser side.

As an example, after the malicious network address determining module determines that a URL of download type is a malicious network address, a security information display interface is popped up at the multi-core browser side to prompt that the website to be accessed is a malicious website, and provides in the security information display interface a cancel button for cancelling the download. Reference is made to FIG. 2, which is a schematic diagram of a security information display interface of download type in this embodiment.

As an example, after the malicious network address determining module determines that a URL of non-download type is a malicious network address, a security information display interface is popped up at the multi-core browser side to prompt that the website to be accessed is a malicious website, and provides in the security information display interface a close button for closing the current webpage.

FIG. 3a shows a schematic diagram of security information of non-download type in an address bar according to an embodiment of the disclosure. Therein, when a URL of non-download type is a malicious network address, security prompt information is displayed in the address bar, e.g., "dangerous", and for eye catching, the security information prompt may be highlighted using a color such as red color, etc.

FIG. 3b shows a schematic diagram of a popup window of security information of non-download type according to an embodiment of the disclosure. When the security information prompt in the address bar is clicked, a window as shown in FIG. 3b is popped up. The window comprises: further security prompt information; the network address to be accessed; page close button, e.g., "close the current page"; and other functional links, for example, a link to continue access to the URL "ignore the warning and continue access", a link to perform a security detection "secure access", a link to complain about the malicious website "network address complaint", and a link to access a monitoring center "network address monitoring center".

The window in FIG. 3b and the address bar in FIG. 3a may be displayed individually respectively, or also may be displayed in one and the same interface simultaneously.

FIG. 3a and FIG. 3b are just one example of the security information display interface of a malicious network address of non-download type, the disclosure is not limited thereto, and the security information display interface of a malicious network address of non-download type may comprise any security prompt information related with a malicious network address of non-download type.

Thus, by the security information display interface, a user is prompted that the network address to be accessed is a malicious network address, and the user is provided with an interface which may be used for closing a webpage.

From the above, in this embodiment, since the malicious network address determining module for judging whether a network address is a malicious network address is an internal module of the browser, the malicious network address determining module is started simultaneously when the browser is started, thereby solving the problem that a terminal can not intercept a malicious network address accessed in the browser since no third-party device is installed on the terminal or when a third-party device is not started on the terminal; and achieving the beneficial effect of ensuring a timely and effective interception of a malicious network address.

The algorithms and displays provided here are not inherently related to any specific computer, virtual system or other device. Various general-purpose systems may also be used with the teachings herein. According to the above description, the structure required for constructing such systems is obvious. In addition, the disclosure is not directed to any specific programming language. It should be understood that the content of the disclosure described herein may be carried out utilizing various programming languages, and that the above description for a specific language is for the sake of disclosing preferred embodiments of the disclosure.

For a device embodiment, it is described relatively simply due to its substantial similarity to a corresponding method embodiment, and as for its relevant parts reference may be made to the description of the parts of the method embodiment.

The individual embodiments in the specification are described using a progressive manner, each embodiment highlights its difference from other embodiments, and identical or similar parts of the individual embodiments may be referred relative to each other.

Embodiments of the individual components of the disclosure may be implemented in hardware, or in a software module running on one or more processors, or in a combination thereof. It will be appreciated by those skilled in the art that, in practice, some or all of the functions of some or all of the components in a multi-core browser device for intercepting a malicious network address according to individual embodiments of the disclosure may be realized using a microprocessor or a digital signal processor (DSP). The disclosure may also be implemented as a device or apparatus program (e.g., a computer program and a computer program product) for carrying out a part or all of the method as described herein. Such a program implementing the disclosure may be stored on a computer readable medium, or may be in the form of one or more signals. Such a signal may be obtained by downloading it from an Internet website, or provided on a carrier signal, or provided in any other form.

Figure 8:
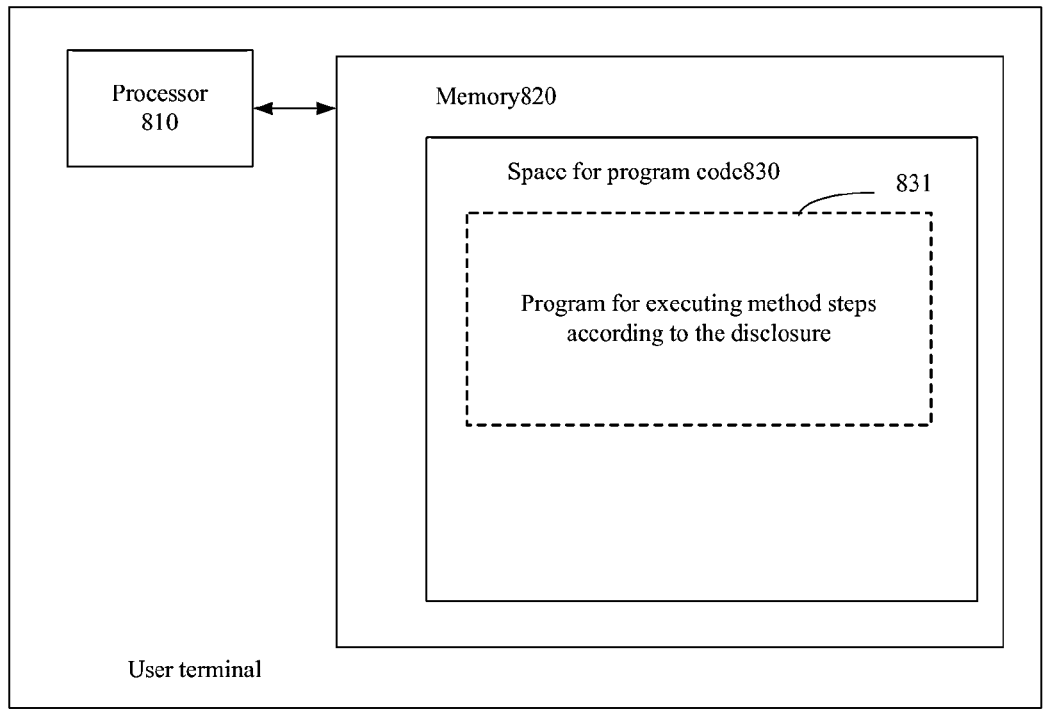
FIG. 8 shows schematically a block diagram of a user terminal for performing a method according to the disclosure.
Figure 9:
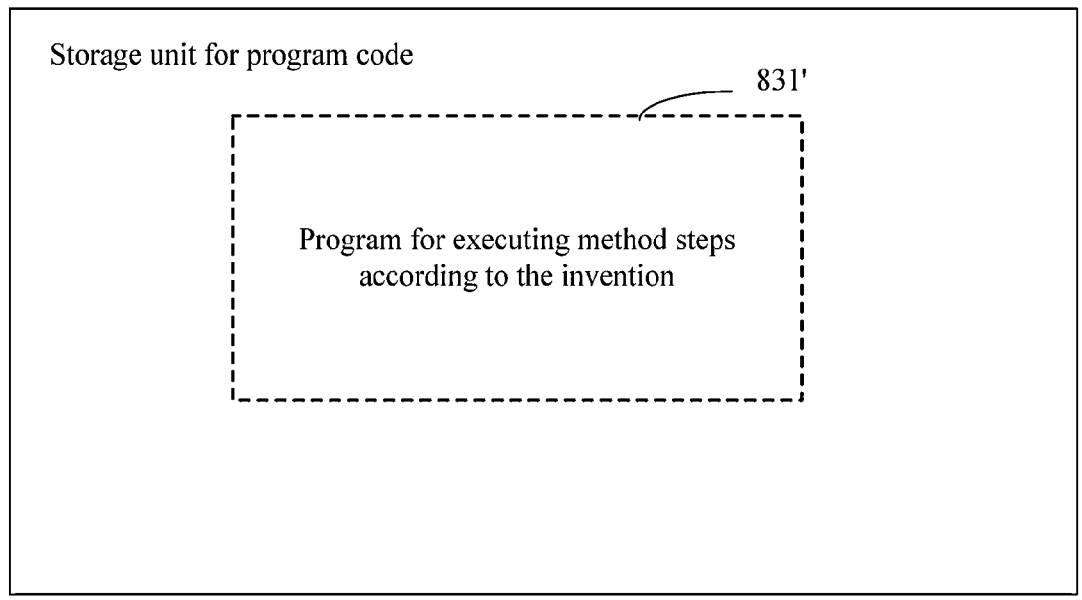
FIG. 9 shows schematically a storage unit for retaining or carrying a program code implementing a method according to the disclosure.

For example, FIG. 8 shows a user terminal which may carry out a method for intercepting a malicious network address in a multi-core browser according to the disclosure. The user terminal traditionally comprises a processor 810 and a computer program product or a computer readable medium in the form of a memory 820. The memory 820 may be an electronic memory such as a flash memory, an EEPROM (electrically erasable programmable read-only memory), an EPROM, a hard disk or a ROM. The memory 820 has a memory space 830 for a program code 831 for carrying out any method steps in the methods as described above. For example, the memory space 830 for a program code may comprise individual program codes 831 for carrying out individual steps in the above methods, respectively. The program codes may be read out from or written to one or more computer program product. These computer program products comprise such a program code carrier as a hard disk, a compact disk (CD), a memory card or a floppy disk. Such a computer program product is generally a portable or stationary storage unit as described with reference to FIG. 9. The storage unit may have a memory segment, a memory space, etc. arranged similarly to the memory 820 in the user terminal of FIG. 8. The program code may for example be compressed in an appropriate form. In general, the storage unit comprises a computer readable code 831', i.e., a code which may be read by e.g., a processor such as 810, and when run by a user terminal, the codes cause the user terminal to carry out individual steps in the methods described above.

"An embodiment", "the embodiment" or "one or more embodiments" mentioned herein implies that a particular feature, structure or characteristic described in connection with an embodiment is included in at least one embodiment of the disclosure. In addition, it is to be noted that, examples of a phrase "in an embodiment" herein do not necessarily all refer to one and the same embodiment.

In the specification provided herein, a plenty of particular details are described. However, it can be appreciated that an embodiment of the disclosure may be practiced without these particular details. In some embodiments, well known methods, structures and technologies are not illustrated in detail so as not to obscure the understanding of the specification.

It is to be noted that the above embodiments illustrate rather than limit the disclosure, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The disclosure may be implemented by means of a hardware comprising several distinct elements and by means of a suitably programmed computer. In a unit claim enumerating several means, several of the means may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the disclosure. Therefore, for those of ordinary skills in the art, many modifications and variations are apparent without departing the scope and spirit of the appended claims. For the scope of the disclosure, the disclosure of the disclosure is illustrative, but not limiting, and the scope of the disclosure is defined by the appended claims.

The invention claimed is:

1. A method for intercepting a malicious network address in a multi-core browser, comprising:
    obtaining URL information of a webpage currently requested to be loaded;
    after determining a core for rendering the webpage to be loaded according to the URL information, initiating a request to the multi-core browser that includes an internal module for determining whether a network address is a malicious network address, wherein the internal module of the multi-core browser is started simultaneously when the multi-core browser is started so as to intercept loading access to the network address which is determined as a malicious network address; and
    after the multi-core browser receiving the request, loading the URL at the multi-core browser and performing a cloud network address security query for the URL by a network address security determining server in response to a determination that the URL belongs to neither a local white list nor a local black list, wherein the performing the cloud network address security query for the URL by the network address security determining server further comprising: determining a type of the URL,
        in response to a determination that the type is a non-download type, informing the network address security determining server to perform the cloud network address security query for the URL, and
        in response to a determination that the type is a download type, recording the URL in the download request, forming a uniform resource locator link URLList, extracting an original URL and a resource URL from the URLList, and informing the network address security determining server to perform the cloud network address security query for the original URL and the resource URL,
    intercepting loading access to the network address which is determined as a malicious network address at the multi-core browser.

2. The method as claimed in claim 1, wherein
    the determining the core for rendering the webpage to be loaded according to the URL information comprises:
    querying the core corresponding to the URL in the URL information in a mapping table in which network addresses correspond to cores, and determining to use the queried core when the webpage to be loaded is rendered.

3. The method as claimed in claim 1, wherein the method further comprises:
    after the multi-core browser receiving the request, determining whether the URL in the URL information belongs to the local white list, and if the URL belongs to the local white list, then loading the URL and invoking the determined core to render the webpage to be loaded; and if the URL does not belong to the local white list, then determining whether the URL belongs to the local black list, and if the URL belongs to the local black list, then querying the security information of the URL from a network address security determining server.

4. The method as claimed in claim 1, wherein the method further comprises:
    receiving a result of the cloud network address security query from the network address security determining server, and caching the result.

5. The method as claimed in claim 4, wherein
    performing a cloud network address security query for the URL by the network address security determining server comprises:
    querying the security information corresponding to the URL in the cached result to determine whether the URL is a malicious network address, and if the security information corresponding to the URL is not queried in the cached result, then performing the cloud network address security query for the URL by the network address security determining server.

6. The method as claimed in claim 1, wherein the method further comprises:
    downloading an updated black list or white list by the network address security determining server, and using the downloaded black list or white list to update the local black list or the local white list.

7. The method as claimed in claim 1, wherein
    the intercepting loading access to the network address determined as a malicious network address at the multi-core browser comprises:
    after determining that a URL of download type is a malicious network address, popping up a security information display interface at the multi-core browser to prompt that the website to be accessed is a malicious website, and providing in the security information display interface a cancel button for cancelling the download.

8. The method as claimed in claim 1, wherein
    the intercepting loading access to the network address which is determined as a malicious network address at the multi-core browser comprises:
    after determining that a URL of non-download type is a malicious network address, popping up a security information display interface at the multi-core browser to prompt that the website to be accessed is a malicious website, and providing in the security information display interface a close button for closing the current webpage.

9. A device for intercepting a malicious network address in a multi-core browser comprising:
    a memory having instructions stored thereon; and
    at least one processor configured to execute the instructions to perform operations for intercepting a malicious network address in the multi-core browser, the operations comprising:
    obtaining URL information of a webpage currently requested to be loaded;
    determining a core for rendering the webpage to be loaded according to the URL information, and after finishing the determining the core, initiating a request to the multi-core browser that includes an internal module for determining whether a network address is a malicious network address, wherein the internal module of the multi-core browser is started simultaneously when the multi-core browser is started so as to intercept loading access to the network address which is determined as a malicious network address;

after the multi-core browser receiving the request, loading the URL at the multi-core browser and performing a cloud network address security query for the URL by a network address security determining server in response to a determination that the URL belongs to neither a local white list nor a local black list, wherein the operation of performing the cloud network address security query for the URL by the network address security determining server further comprises: determining a type of the URL, in response to a determination that the type is a non-download type, informing the network address security determining server to perform the cloud network address security query for the URL, and in response to a determination that the type is a download type, recording the URL in the download request, forming a uniform resource locator link URLList, extracting an original URL and a resource URL from the URLList, and informing the network address security determining server to perform the cloud network address security query for the original URL and the resource URL, determining whether the URL is a malicious network address after receiving the request; and intercepting loading access to the network address which is determined as a malicious network address at the multi-core browser.

10. The device as claimed in claim 9, wherein the operation of determining the core for rendering the webpage to be loaded according to the URL information comprises:

querying the core corresponding to the URL in the URL information in a mapping table in which network addresses correspond to cores, and determining to use the queried core when the webpage to be loaded is rendered.

11. The device as claimed in claim 9, wherein the operations further comprise:

after receiving the request, determining whether the URL in the URL information belongs to the local white list, and if the URL belongs to the local white list, then loading the URL and invoking the determined core to render the webpage to be loaded; and if the URL does not belong to the local white list, then determining whether the URL belongs to the local black list, and if the URL belongs to the local black list, then querying the security information of the URL from a network address security determining server.

12. The device as claimed in claim 9, wherein the operations further comprise:

receiving the result of the cloud network address security query from the network address security determining server, and caching the result.

13. The device as claimed in claim 12, wherein the operation of performing a cloud network address security query for the URL by the network address security determining server comprises:

querying the security information corresponding to the URL in the cached result to determine whether the URL is a malicious network address, and if the security information corresponding to the URL is not queried in the cached result, then performing the cloud network address security query for the URL by the network address security determining server.

14. The device as claimed in claim 9, wherein the operations further comprise:

downloading an updated black list or white list by the network address security determining server, and using the downloaded black list or white list to update the local black list or the local white list.

15. The device as claimed in claim 9, wherein the operation of intercepting loading access to the network address which is determined as a malicious network address at the multi-core browser comprises:

after determining that a URL of download type is a malicious network address, popping up a security information display interface to prompt that the website to be accessed is a malicious website, and providing in the security information display interface a cancel button for cancelling the download.

16. A non-transitory computer readable medium having instructions stored thereon that, when executed by at least one processor, cause the at least one processor to perform operations for intercepting a malicious network address in a multi-core browser, the operations comprising:

obtaining URL information of a webpage currently requested to be loaded;

after determining a core for rendering the webpage to be loaded according to the URL information, initiating a request to the multi-core browser that includes an internal module for determining whether a network address is a malicious network address, wherein the internal module of the multi-core browser is started simultaneously when the multi-core browser is started so as to intercept the malicious network address accessed in the multi-core browser; and after the multi-core browser receiving the request, loading the URL at the multi-core browser and performing a cloud network address security query for the URL by a network address security determining server in response to a determination that the URL belongs to neither a local white list nor a local black list, wherein the operation of performing the cloud network address security query for the URL by the network address security determining server further comprises: determining a type of the URL, in response to a determination that the type is a non-download type, informing the network address security determining server to perform the cloud network address security query for the URL, and in response to a determination that the type is a download type, recording the URL in the download request, forming a uniform resource locator link URLList, extracting an original URL and a resource URL from the URLList, and informing the network address security determining server to perform the cloud network address security query for the original URL and the resource URL, intercepting loading access to the network address which is determined as a malicious network address at the multi-core browser.

* * * * *